June 2, 1925.
W. C. MAURER
1,540,358
DETACHABLE HANDLE FOR UTENSILS
Filed July 7, 1924
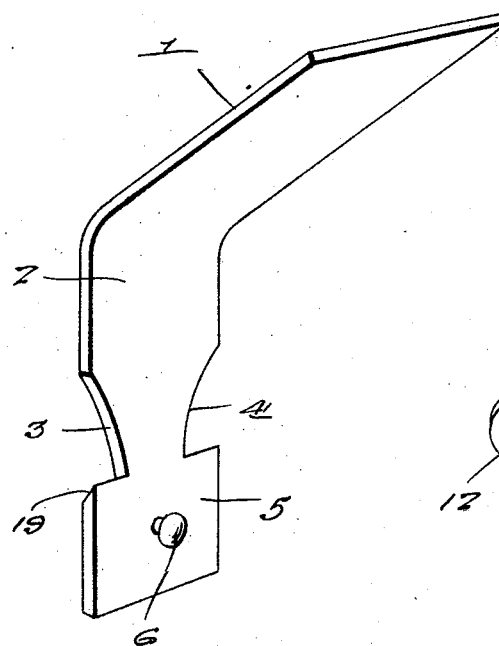
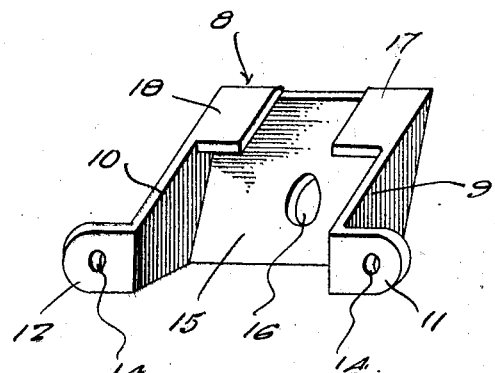
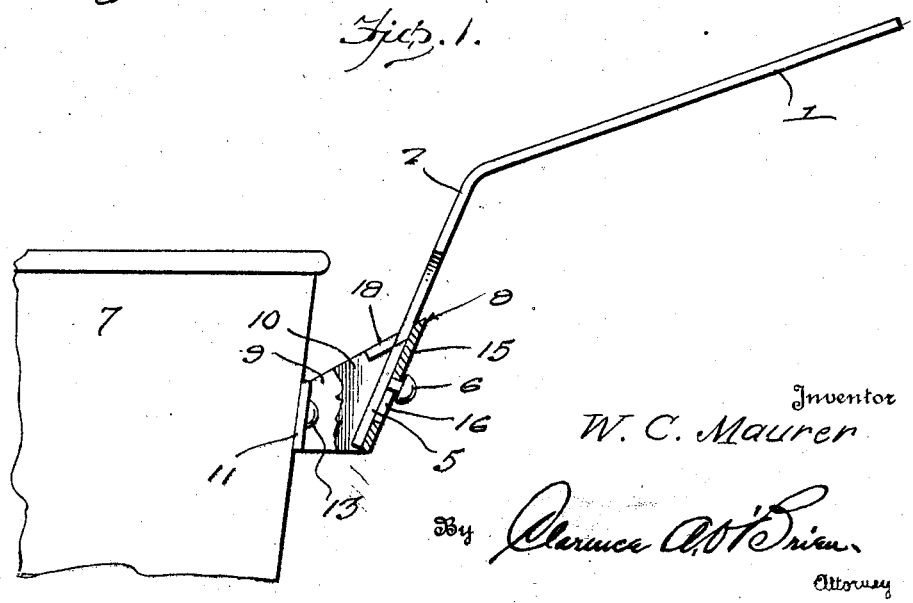
Inventor
W. C. Maurer
By Clarence A. O'Brien
Attorney Patented June 2, 1925.

1,540,358

UNITED STATES PATENT OFFICE.

WILLIAM C. MAURER, OF NEW LONDON, CONNECTICUT.

DETACHABLE HANDLE FOR UTENSILS.

Application filed July 7, 1924. Serial No. 724,647.

*To all whom it may concern:*

Be it known that I, WILLIAM C. MAURER, a citizen of the United States, residing at New London, in the county of New London and State of Connecticut, have invented certain new and useful Improvements in Detachable Handles for Utensils, of which the following is a specification.

This invention relates to new and useful improvements in detachable handles, and has for its principal object to provide a device which is principally adapted for use in connection with cooking utensils.

One of the important objects of the present invention is to provide a detachable handle, wherein the same is adapted to cooperate with a suitable sprocket provided on the various kitchen utensils, locking means being associated therewith for securing the handle against accidental displacement from the socket, yet enabling the handle to be readily and quickly disengaged from the socket, whenever desired.

A further object of the invention is to provide a detachable handle of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1 is a side elevation of my improved handle, showing the same in locked engagement with the socket on a receptacle.

Figure 2 is a detail perspective view of the socket, and

Figure 3 is a detail perspective view of the handle.

The various kitchen utensils now in use are, in most instances, provided with a permanent handle, and often times when a cooking utensil is in position on a stove, a person will accidentally strike the handle, causing the receptacle to be overturned, and spilling the contens thereof. Furthermore, the provision of a permanent handle, on a cooking utensil, when the same is on a stove will become very hot, and a person will burn the hands in attempting to remove the receptacle from the stove. Furthermore, where the cooking utensils are provided with permanent handles, the same occupy considerable space, when not in use, in pantries or closets, usually provided for the reception thereof, and the present invention contemplates overcoming the above disadvantages.

In the drawing, wherein for the purpose of illustration is shown the preferred embodiment of my invention, the numeral 1 designates generally my improved detachable handle, and the same is provided from a suitable strip of metal. The strip of metal forming the handle is bent downwardly intermediate its ends, as illustrated at 2, and the downwardly extending portion is provided with notches 3 and 4 respectively, in the sides thereof, adjacent the lower ends of the same, to provide a head 5. A headed stud 6, projects outwardly from the central portion of the head 5, in the manner as clearly illustrated in Figure 3 of the drawing, and the purpose thereof will be hereinafter more fully described. A kitchen utensil of any well known construction is illustrated at 7, in the drawings, and supported thereon, adjacent the upper edge thereof is the socket, generally designated by the numeral 8. The socket member comprises a substantially U-shaped device, the arm portions 9 and 10 respectively thereof, tapering gradually toward their outer ends and terminate in the laterally extending ears 11 and 12 respectively, the same providing means for securing the socket member to the side of the utensil 7, by means of the fastening elements 13, which extend through the openings 14 provided in each of the laterally extending ears 11 and 12.

The crown portion 15 of the U-shaped socket member 8 is inclined upwardly, as illustrated more clearly in Figure 1 of the drawings, and is provided with an oval shaped opening 16, in the central portion thereof, for the purpose of receiving the headed stud 6, carried by the head 5, of the handle 1, in the manner hereinafter to be more fully described.

Formed on the upper edges of the arms 9 and 10 respectively, of the U-shaped socket portion adjacent the crown portion 15 thereof, are the inwardly extending lips or projections 17 and 18 respectively. This construction is more clearly illustrated in Figure 2 of the drawing.

In securing the detachable handle in position, in the U-shaped socket member 8 of a kitchen utensil, the handle 1 has its downwardly extending portion inserted in the socket member between the reduced portions of the arms, so that the head 5 is in position between the arms. The head is then moved rearwardly so that the stud 6 carried thereby will enter the oval shaped opening 16 provided in the crown portion 15 of the socket member, and the head 5 will then be disposed below the lips 17 and 18. The handle is then raised upwardly so that the headed stud 6 will be disposed in the upper portion of the oval shaped slot 16, which is reduced, preventing the lateral displacement of the handle from the socket member, and the upper edges of the head 5, adjacent the notches 3 and 4, are bevelled as illustrated at 19, for engagement with the bevelled under sides of the lips 17 and 18.

The engagement of the bevelled upper edge of the head 5, with the lips 17 and 18 will prevent a further upward movement of the handle with respect to the socket member, and the head will be adapted to lie flush against the inner side of the crown portion 15, in the manner as clearly illustrated in Figure 1. When the handle is in the position shown in Figure 1, the cooking utensil may be readily removed from the stove or placed thereon as is desired, without any danger of the person coming in contact with the hot utensil, which would cause a possible injury to the person's hands. The handle may be readily engaged or disengaged from the socket member 8 in a comparatively simple and efficient manner, and by removing the handle, various cooking utensils provided with socket members, such as is shown in the drawing, may be more conveniently stored away in the closet or cabinet provided therefor, without taking up as much room as is occupied by utensils provided with said permanent handles.

The simplicity of my device enables the same to be manufactured at a very low cost, and will further be strong and durable as well as efficient in its use.

While I have shown the preferred embodiment of my invention, it is to be understood that various changes in the size, shape, and arrangement of parts, may be resorted to, without departing from the spirit of the invention or the scope of the appended claims.

Having thus described my invention, what I claim is:

1. In combination with a receptacle, a detachable handle therefor comprising an elongated strip of metal bent downwardly adjacent one end, said downwardly extending portion having notches provided in the sides thereof, adjacent the lower end of the same for forming a head member, a socket on said receptacle for receiving said head member, means for locking the head member in said socket, said means comprising a headed stud carried by the head member and adapted to be received in a substantially oval shaped opening provided in the socket member, and lips formed on said socket member for engagement with the upper edge of the head member.

2. In combination with a receptacle, a detachable handle therefor comprising an elongated strip of metal bent normally intermediate its ends, said downwardly extending portion having notches provided in the sides thereof adjacent the lower end of the same, and forming a head member, a substantially U-shaped socket member, the ends of the arms thereof terminating in laterally extending ears providing means for securing the socket member on said receptacle, inwardly projecting lips formed on the upper edges of the arms of the U-shaped member adjacent the crown portion thereof, for engagement with the upper edge of the head member, the crown portion of the U-shaped socket member having an oval shaped opening provided therein, and a headed stud carried by the head member adapted to be received in said oval shaped opening, for preventing the accidental displacement of the handle from said socket member.

In testimony whereof I affix my signature.

WILLIAM C. MAURER.